United States Patent
Hepworth

(10) Patent No.: US 6,942,152 B1
(45) Date of Patent: Sep. 13, 2005

(54) VERSATILE GRAPHICAL CODE READER THAT IS CONFIGURED FOR EFFICIENT DECODING

(75) Inventor: Paul J. Hepworth, Riverton, UT (US)

(73) Assignee: The Code Corporation, Draper, UT (US)

(*) Notice: Subject to any disclaimer, the term of this patent is extended or adjusted under 35 U.S.C. 154(b) by 0 days.

(21) Appl. No.: 10/761,711

(22) Filed: Jan. 21, 2004

(51) Int. Cl.[7] .............................................. G02B 26/10
(52) U.S. Cl. .................................. 235/462.25; 382/103
(58) Field of Search ..................... 235/462.25, 462.16, 235/462.07, 494; 382/103; 463/36

(56) References Cited

U.S. PATENT DOCUMENTS

| | | |
|---|---|---|
| 4,843,222 A | 6/1989 | Hochgraf |
| 5,153,418 A | 10/1992 | Batterman et al. |
| 5,166,500 A | 11/1992 | Yoon et al. |
| 5,189,292 A | 2/1993 | Batterman et al. |
| 5,223,701 A | 6/1993 | Batterman et al. |
| 5,343,028 A | 8/1994 | Figarella et al. |
| 5,352,878 A | 10/1994 | Smith et al. |
| 5,412,196 A | 5/1995 | Surka |
| 5,428,211 A | 6/1995 | Zheng et al. |
| 5,438,188 A | 8/1995 | Surka |
| 5,478,999 A | 12/1995 | Figarella et al. |
| 5,545,887 A | 8/1996 | Smith et al. |
| 5,627,366 A | 5/1997 | Katz |
| 5,814,803 A | 9/1998 | Olmstead et al. |
| 5,867,584 A * | 2/1999 | Hu et al. ..................... 382/103 |
| 5,946,041 A * | 8/1999 | Morita .................... 348/416.1 |
| 6,095,420 A | 8/2000 | Kawai et al. |
| 6,318,637 B1 | 11/2001 | Stoner |
| 6,340,994 B1 * | 1/2002 | Margulis et al. ............ 348/625 |
| 6,711,278 B1 * | 3/2004 | Gu et al. .................... 382/103 |
| 2002/0037770 A1 * | 3/2002 | Paul et al. ..................... 463/36 |

* cited by examiner

Primary Examiner—Daniel Stcyr
Assistant Examiner—Daniel A. Hess
(74) Attorney, Agent, or Firm—Madson & Metcalf

(57) ABSTRACT

A versatile graphical code reader that is configured for efficient decoding is disclosed. In an exemplary embodiment, the graphical code reader includes an image sensor. The graphical code reader also includes a region selection component that selects a first region of a digital image obtained from the image sensor. The first region of the digital image corresponds to a same region of the image sensor as a decoded region in a most recently decoded digital image. The graphical code reader also includes a processing component that processes the first region of the digital image before processing any other region of the digital image.

9 Claims, 10 Drawing Sheets

VERSATILE GRAPHICAL CODE READER THAT IS CONFIGURED FOR EFFICIENT DECODING

TECHNICAL FIELD

The present invention relates generally to graphical code readers. More specifically, the present invention relates to improved decoding methods in a versatile graphical code reader that is configured to read different types of graphical codes.

BACKGROUND

A machine-readable graphical code ("graphical code") is a graphical representation of information that consists of multiple graphical code elements having different light reflective or light emissive properties. Examples of different types of graphical codes include bar codes, data matrix codes, MaxiCodes, and so forth. Graphical codes have become widely used in many commercial environments, such as point-of-sale stations in retail stores and supermarkets, inventory and document tracking, and the like.

Devices for identifying or extracting information from graphical codes are generally referred to as graphical code readers. Graphical code readers typically include one or more light sources for illuminating a graphical code. Light is reflected from the graphical code toward the graphical code reader. A lens within the graphical code reader focuses an image of the graphical code onto an image sensor. Pixels within the image sensor are read electronically to provide a two-dimensional array of image data corresponding to the graphical code. A decoder then processes the image data and extracts the information contained in the graphical code.

Different types of graphical codes include different types of graphical code elements. For example, bar codes include variable-width rectangular bars. Data matrix codes include square data modules. MaxiCodes include a central finder pattern and a grid of hexagons surrounding the central finder pattern.

Different types of graphical codes may vary in size. For example, bar codes are typically larger in size than data matrix codes. The graphical code elements within different types of graphical codes may also vary in size. For example, the variable-width rectangular bars in bar codes are typically larger than the square data modules in data matrix codes or the hexagons in MaxiCodes.

One characteristic which affects the performance of graphical code readers is the position of the lens relative to the graphical code and the image sensor. Moving the lens closer to the graphical code and farther away from the image sensor increases the magnification of the graphical code elements on the image sensor, which increases the resolution and decreases the field of view of the image that is formed. Conversely, moving the lens closer to the image sensor and farther away from the graphical code decreases the magnification of the graphical code elements on the image sensor, which decreases the resolution and increases the field of view of the resulting image.

Lens arrangements that are capable of providing high resolution images are optimized for reading graphical codes with relatively small graphical code elements, while lens arrangements that are capable of providing images that have a large field of view are optimized for reading large graphical codes. Sometimes, however, it may be desirable to read both small, high-density graphical codes and large graphical codes. Accordingly, benefits may be realized by a versatile graphical code reader that is capable of reading both large graphical codes and graphical codes with small graphical code elements. Benefits may also be realized by improved decoding methods in such a versatile graphical code reader.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
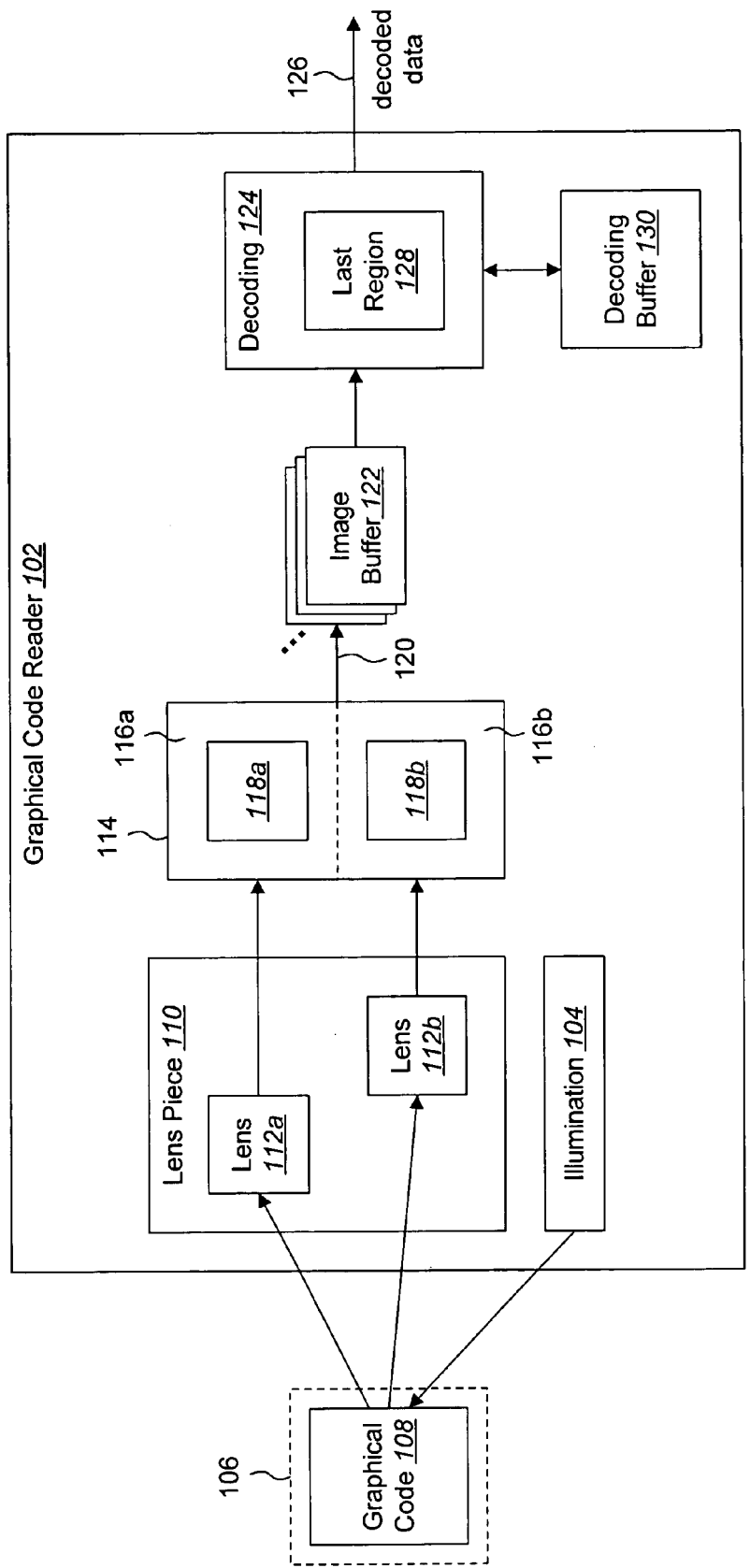
FIG. 1 is a block diagram illustrating functional components in an embodiment of a graphical code reader.

A method in a graphical code reader is disclosed. The method involves obtaining a digital image from an image sensor. A first region of the digital image is selected. The first region of the digital image corresponds to a same region of the image sensor as a decoded region in a most recently decoded digital image. The method also involves processing the first region of the digital image before processing any other region of the digital image. In some embodiments, a second region of the digital image is processed only if the first region of the digital image is not successfully decoded.

Another embodiment of a method in a graphical code reader is also disclosed. The method involves obtaining a set of digital images from a plurality of image sensors. A first digital image is selected in the set of digital images. The first digital image corresponds to a same image sensor as a most recently decoded digital image. The first digital image is processed before any other digital image in the set of digital images is processed. In some embodiments, a second digital image in the set of the digital images is processed only if the first digital image is not successfully decoded.

Another embodiment of a method in a graphical code reader is also disclosed. The method involves forming a first optical image on a first region of an image sensor, and forming a second optical image on a second region of the image sensor. A digital image is obtained from the image sensor. A first region of the digital image corresponds to the first optical image on the first region of the image sensor, and a second region of the digital image corresponds to the second optical image on the second region of the image sensor. The method also involves selecting one of the first region of the digital image and the second region of the digital image to obtain a selected region. The selected region corresponds to a same region of the image sensor as a decoded region in a most recently decoded digital image. The method also involves processing the selected region of the digital image before processing any other region of the digital image. In some embodiments, the first optical image has a higher resolution and a smaller field of view than the second optical image.

Another embodiment of a method in a graphical code reader is also disclosed. The method involves forming a first optical image on a first image sensor, and forming a second optical image on a second image sensor. A set of digital images are obtained. The set of digital images includes a first digital image corresponding to the first optical image on the first image sensor, and a second digital image corresponding to the second optical image on the second image sensor. The method also involves selecting one of the first digital image and the second digital image to obtain a selected digital image. The selected digital image corresponds to a same image sensor as a most recently decoded digital image. The method also involves processing the selected digital image before processing any other digital image of the set of digital images. In some embodiments, the first optical image has a higher resolution and a smaller field of view than the second optical image.

A graphical code reader is disclosed. The graphical code reader includes an image sensor. The graphical code reader also includes a region selection component that selects a first region of a digital image obtained from the image sensor. The first region of the digital image corresponds to a same region of the image sensor as a decoded region in a most recently decoded digital image. The graphical code reader also includes a processing component that processes the first region of the digital image before processing any other region of the digital image. In some embodiments, the processing component processes a second region of the digital image only if the first region of the digital image is not successfully decoded.

Another embodiment of a graphical code reader is also disclosed. The graphical code reader includes a plurality of image sensors. The graphical code reader also includes an image selection component that selects a first digital image in a set of digital images obtained from the plurality of image sensors. The first digital image corresponds to a same image sensor as a most recently decoded digital image. The graphical code reader also includes a processing component that processes the first digital image before processing any other digital image in the set of digital images. In some embodiments, the processing component processes a second digital image in the set of the digital images only if the first digital image is not successfully decoded.

Another embodiment of a graphical code reader is also disclosed. The graphical code reader includes an image sensor. The graphical code reader also includes a first lens that forms a first optical image on a first region of the image sensor, and a second lens that forms a second optical image on a second region of the image sensor. The graphical code reader also includes a region selection component that obtains a digital image from the image sensor and selects one of a first region of the digital image and a second region of the digital image to obtain a selected region of the digital image. The first region of the digital image corresponds to the first optical image on the first region of the image sensor, and the second region of the digital image corresponds to the second optical image on the second region of the image sensor. The selected region of the digital image corresponds to a same region of the image sensor as a decoded region in a most recently decoded digital image. The graphical code reader also includes a processing component that processes the selected region of the digital image before processing any other region of the digital image.

In some embodiments, a first distance between the first lens and the first region of the image sensor may be greater than a second distance between the second lens and the second region of the image sensor. The first lens may be substantially identical to the second lens. The first lens and the second lens may be fixed in position.

Another embodiment of a graphical code reader is also disclosed. The graphical code reader includes a first image sensor and a first lens that forms a first optical image on the first image sensor. The graphical code reader also includes a second image sensor and a second lens that forms a second optical image on the second image sensor. The graphical code reader also includes an image selection component that obtains a set of digital images. The set of digital images includes a first digital image corresponding to the first optical image on the first image sensor and a second digital image corresponding to the second optical image on the second image sensor. The image selection component also selects one of the first digital image and the second digital image to obtain a selected digital image. The selected digital image corresponds to a same image sensor as a most recently decoded digital image. The graphical code reader also includes a processing component that processes the selected digital image before processing any other digital image of the set of digital images.

In some embodiments, a first distance between the first lens and the first image sensor may be greater than a second distance between the second lens and the second image sensor. The first lens may be substantially identical to the second lens. The first lens and the second lens may be fixed in position.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Those skilled in the art will appreciate that many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, those skilled in the art will recognize that such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a block diagram illustrating functional components in an embodiment of a graphical code reader 102. The illustrated functional components may be implemented using any suitable combination of hardware, software, and/or firmware. In some embodiments, multiple functional components may be implemented by the same physical component.

The graphical code reader 102 includes an illumination component 104. The illumination component 104 includes a plurality of illumination elements (not shown) which may be activated to illuminate a region of space which will be referred to herein as an illumination area 106. In typical operation, the graphical code reader 102 is positioned so that a graphical code 108 is located within the illumination area 106.

The graphical code reader 102 also includes a lens piece 110 that includes a plurality of lenses 112. Two lenses 112 are included in the embodiment shown in FIG. 1, a first lens 112a and a second lens 112b. Of course, in alternative embodiments, more than two lenses 112 may be included in the lens piece 110. The lenses 112 possess substantially identical optical properties (e.g., focal length, principal plane, etc.). In addition, the lenses 112 are fixed, that is, the lenses 112 do not move within the lens piece 110.

The graphical code reader 102 also includes an image sensor 114. The image sensor 114 is a solid-state photodetecting device containing a relatively large number of light-sensitive pixels that are arranged in horizontal rows and vertical columns. Examples of different types of image sensors 114 that may be used with embodiments disclosed herein include charge coupled devices (CCDs), complementary metal oxide semiconductor (CMOS) devices, and so forth. The image sensor 114 is partitioned into a plurality of regions 116, one region 116 for each lens 112 in the lens piece 110. In the illustrated embodiment, the image sensor 114 is partitioned into two regions 116, a first region 116a and a second region 116b.

Within the lens piece 110, the lenses 112 are positioned in such a way so that they focus light onto different regions 116 of the image sensor 114. The first lens 112a is positioned so as to focus light onto the first region 116a of the image sensor 114, thereby forming a first optical image 118a on the first region 116a of the image sensor 114. The second lens 112b is positioned so as to focus light onto the second region 116b of the image sensor 114, thereby forming a second optical image 118b on the second region 116b of the image sensor 114.

The lenses 112 are located at different distances from the image sensor 114. In the illustrated embodiment, the distance between the first lens 112a and the first region 116a of the image sensor 114 is greater than the distance between the second lens 112b and the second region 116b of the image sensor 114. Consequently, the first optical image 118a on the first region 116a of the image sensor 114 possesses a higher resolution than the second optical image 118b on the second region 116b of the image sensor 114. Conversely, the first optical image 118a on the first region 116a of the image sensor 114 has a smaller field of view than the second optical image 118b on the second region 116b of the image sensor 114.

A digital image 120 is obtained from the image sensor 114. In typical embodiments, the output of the image sensor 114 is processed somewhat before a digital image 120 is obtained. The image sensor 114 is typically coupled to a read-out circuit (not shown). At the end of an exposure period, the read-out circuit reads the accumulated charge on each light-sensitive element in the image sensor 114 and provides a two-dimensional array of analog signals, one signal for each of the light-sensitive elements in the image sensor 114. The analog signal corresponding to a particular light-sensitive element represents the charge that has accumulated on that light-sensitive element during the exposure period. The gain of the analog signals is adjusted to utilize the dynamic range of an analog-to-digital (A/D) converter (not shown). The A/D converter then digitizes the analog signals, thereby producing the digital image 120.

Each digital image 120 obtained from the image sensor 114 is a two-dimensional array of digital values. The different regions of the digital image 120 correspond to the different regions 116 of the image sensor 114. A first region of the digital image 120 is a digital representation of the first region 116a of the image sensor 114. A second region of the digital image 120 is a digital representation of the second region 116b of the image sensor 114. Consequently, the first region of the digital image 120 includes a digital representation of the first optical image 118a, and the second region of the digital image 120 includes a digital representation of the second optical image 118b.

The graphical code reader 102 also includes a plurality of image buffers 122. Each image buffer 122 is a reserved segment of memory used for storing a digital image 120. In some embodiments, each digital image 120 output from the image sensor 114 is temporarily stored in an image buffer 122 before it is processed. In typical embodiments, the graphical code reader 102 includes at least two image buffers 122, one image buffer 122 for storing the digital image 120 currently being captured, and another image buffer 122 to store the digital image 120 that was previously captured.

The graphical code reader 102 also includes a decoding component 124. The decoding component 124 retrieves digital images 120 from the image buffers 122 and processes them in an attempt to decode them. In the illustrated embodiment, a digital image 120 is decoded when a region of the digital image 120 is decoded. A region of a digital image 120 is decoded when a certain number of graphical code symbols have been identified within the region of the digital image 120. The specific number of graphical code symbols depends on the type of graphical code 108 that is being read. When a digital image 120 has been successfully decoded, the decoding component 124 outputs the decoded data 126.

In typical embodiments, the decoding component 124 processes one digital image 120 at a time. Moreover, in the illustrated embodiment, the decoding component 124 processes a particular digital image 120 one region at a time. For example, the decoding component 124 may begin processing a particular digital image 120 by processing the first region of the digital image 120 (i.e., the portion of the digital image 120 that corresponds to the first optical image 118a on the first region 116a of the image sensor 114). If the first region of the digital image 120 is not decoded, the decoding component 124 then processes the second region of the digital image 120 (i.e., the portion of the digital image 120 that corresponds to the second optical image 118*b* on the second region 116*b* of the image sensor 114).

Once the decoding component 124 decodes a digital image 120, it typically stops processing the digital image 120. In other words, the decoding component 124 typically does not process any remaining regions of the digital image 120. For example, in the illustrated embodiment, suppose that the decoding component 124 begins processing a digital image 120 by processing the first region of the digital image 120. If the decoding component 124 decodes the first region of the digital image 120, then the decoding component 124 typically does not process the second region of the digital image 120.

The decoding component 124 keeps track of the last successfully decoded region 128, i.e., the region that was decoded in the most recently decoded digital image 120. When the decoding component 124 begins processing a new digital image 120, it starts processing the region of the digital image 120 that corresponds to the last successfully decoded region 128. For example, in the illustrated embodiment, suppose that the decoding component 124 decodes a graphical code 108 in the second region of a digital image 120. When the decoding component 124 starts processing the next digital image 120, it would begin by processing the second region of the next digital image 120.

The graphical code reader 102 also includes a decoding buffer 130. The decoding buffer 130 is a reserved segment of memory used by the decoding component 124 during processing of a digital image 120.

Figure 2:
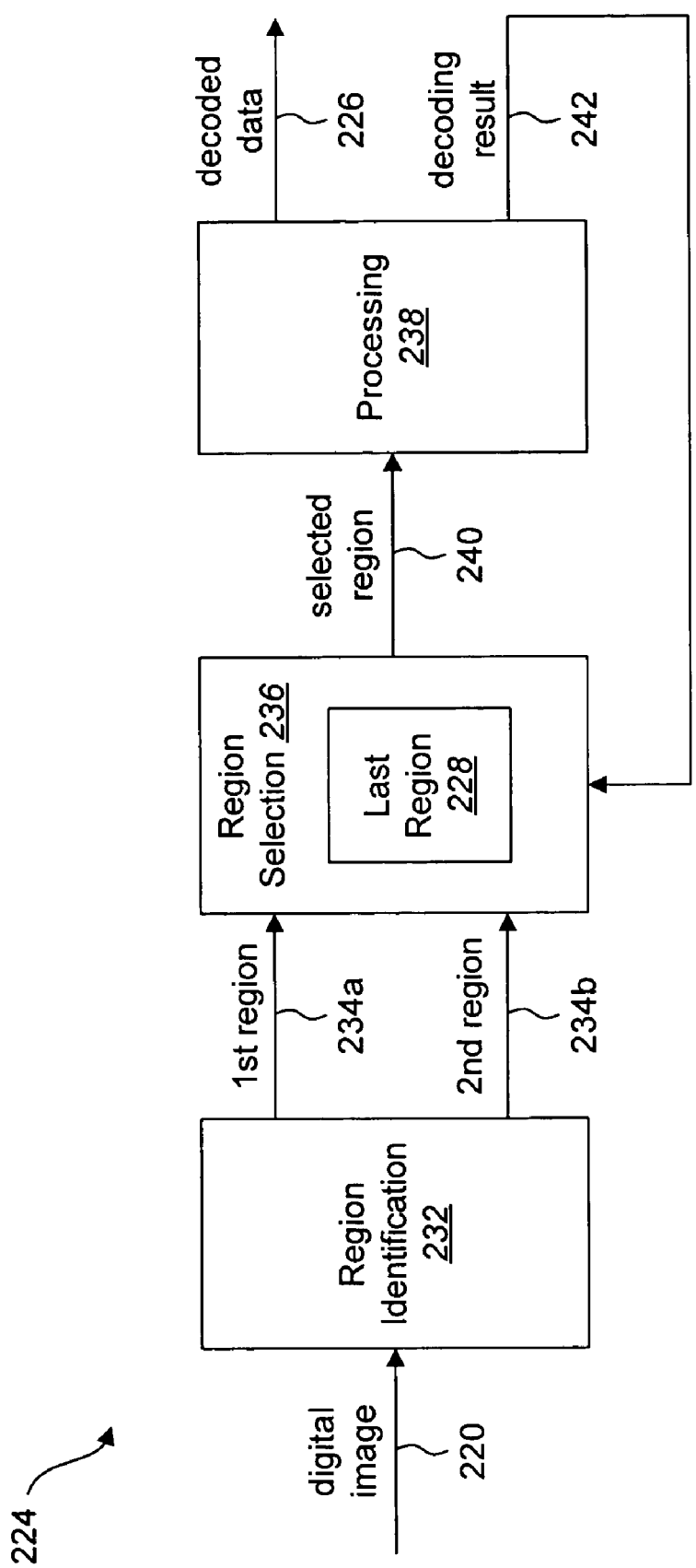
FIG. 2 is a functional block diagram illustrating the components in an embodiment of a decoding component.

FIG. 2 is a functional block diagram illustrating the components in an embodiment of a decoding component 224. The illustrated functional components may be implemented using any suitable combination of hardware, software, and/or firmware. Furthermore, in some embodiments multiple functional components may be implemented by the same physical component.

The decoding component 224 includes a region identification component 232. The region identification component 232 receives a digital image 220 as input and identifies the different regions 234 within the digital image 220. Where an image sensor 114 is partitioned into N regions 116, the region identification component 232 typically identifies N regions 234 in a digital image 220 that is obtained from the image sensor 114. In the illustrated embodiment, the region identification component 232 identifies two regions 234 within the digital image 220, a first region 234*a* and a second region 234*b*. The different regions 234 of a digital image 220 correspond to the different regions 116 of the image sensor 114. In the illustrated embodiment, the first region 234*a* of the digital image 220 includes a digital representation of the first optical image 118*a* formed on the first region 116*a* of the image sensor 114, the second region 234*b* of the digital image 220 includes a digital representation of the second optical image 118*b* formed on the second region 116*b* of the image sensor 114, and so on.

The decoding component 224 also includes a region selection component 236 and a processing component 238. The region selection component 236 receives the different regions 234 of the digital image 220 as input and selects one of the regions 234 for processing. This selected region 240 is provided to the processing component 238 for processing.

After the selected region 240 is processed, the processing component 238 provides decoding result information 242 to the region selection component 236. The decoding result information 242 indicates whether the selected region 240 of the digital image 220 was successfully decoded. If the selected region 240 is successfully decoded, the processing component 238 also outputs the decoded data 226.

An example of how the region selection component 236 may select a region 234 of a digital image 220 for processing will now be described. As shown, the region selection component 236 keeps track of the last successfully decoded region 228. If no region 234 of the digital image 220 has previously been processed, the region selection component 236 selects the region 234 corresponding to the last successfully decoded region 228. If this region 234 is not successfully decoded, the region selection component 236 then selects one of the remaining regions 234 for processing. If one of the remaining regions 234 is successfully decoded, this region 234 then becomes the last successfully decoded region 228. If all of the regions 234 of a digital image 220 have been processed and none of them have been successfully decoded, a new digital image 220 is retrieved from one of the image buffers 122 for processing.

Figure 3:
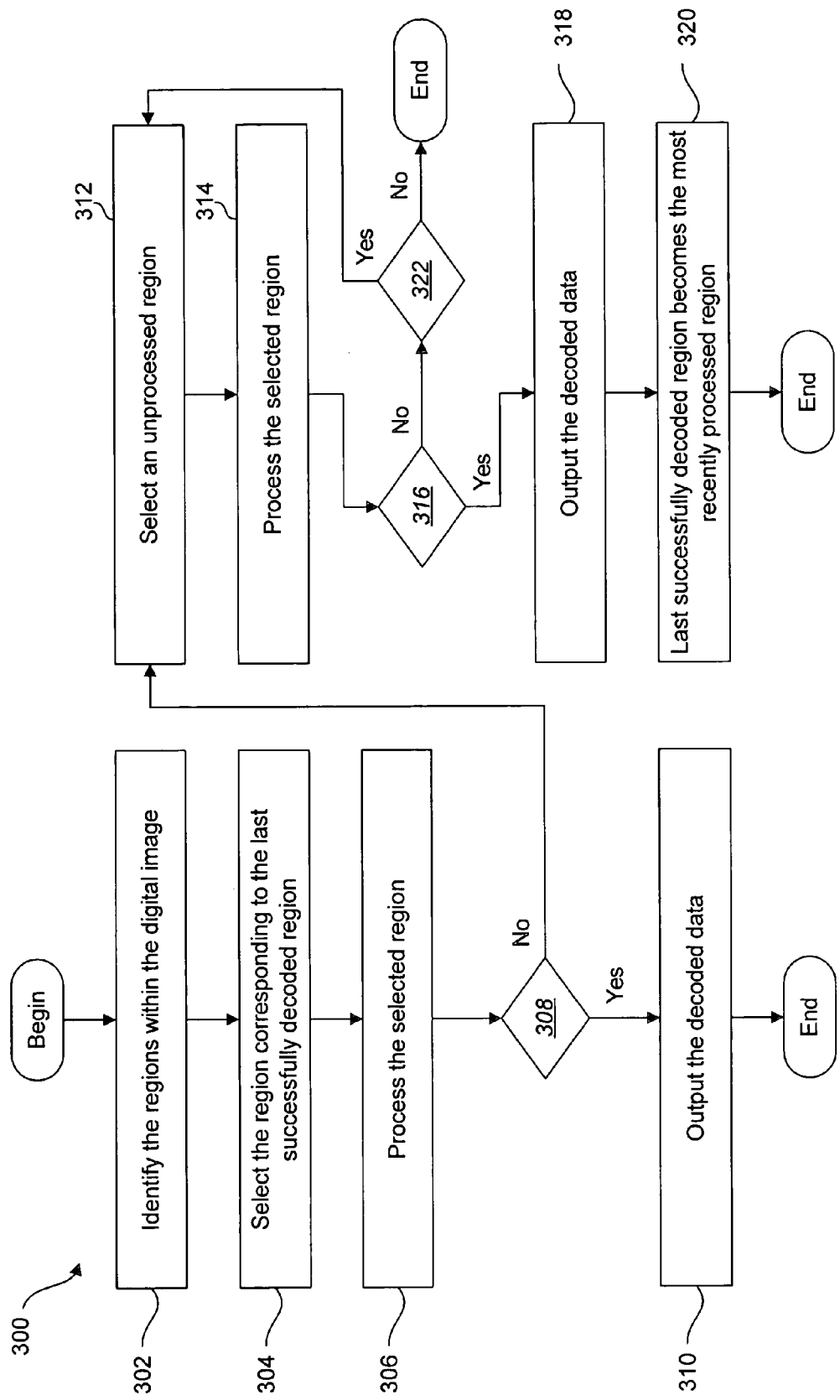
FIG. 3 is a flow diagram illustrating an exemplary method for processing a digital image.

FIG. 3 is a flow diagram illustrating an exemplary method 300 for processing a digital image 120. The method 300 may be performed by the embodiment of the decoding component 224 shown in FIG. 2. The order of the steps of the method 300 is for illustrative purposes only and is not meant to imply a required order.

After a digital image 120 is obtained from an image sensor 114, the region identification component 232 identifies 302 the different regions 234 within the digital image 120. The region selection component 236 selects 304 the region 234 that corresponds to the last successfully decoded region 128 and provides this selected region 240 to the processing component 238. The processing component 238 processes 306 the selected region 240.

The processing component 238 determines 308 whether the selected region 240 is successfully decoded. If so, the processing component 238 outputs 310 the decoded data 126 and the method 300 ends. If not, the processing component 238 informs the region selection component 236, via the decoding result information 242, that decoding was not successful. The region selection component 236 then selects 312 an unprocessed region 234 of the digital image 120. The selected region 240 is provided to the processing component 238. The processing component 238 processes 314 the selected region 240.

The processing component 238 determines 316 whether the selected region 240 is successfully decoded. If so, the processing component 238 outputs 318 the decoded data 126, and the last successfully decoded region 128 becomes 320 the region 234 of the digital image 120 that was processed most recently (i.e., the selected region 240). The method 300 then ends.

If in step 316 the processing component 238 determines that the selected region 240 is not successfully decoded, the processing component 238 informs the region selection component 236, via the decoding result information 242, that decoding was not successful. The region selection component 236 then determines 322 whether there are any additional regions 234 of the digital image 120 that have not been processed. If not, the method 300 ends. If so, the method 300 returns to step 312 and proceeds as described above.

Figure 4:
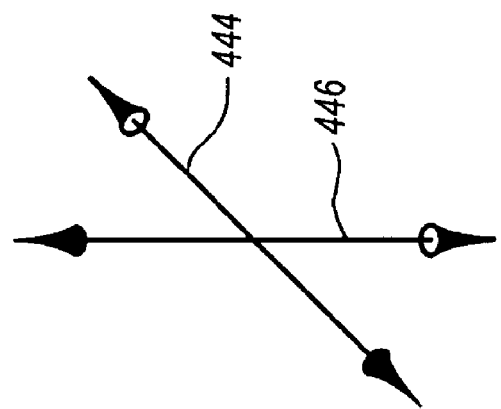
FIG. 4 is a perspective view of an embodiment of a lens piece.
Figure 4:
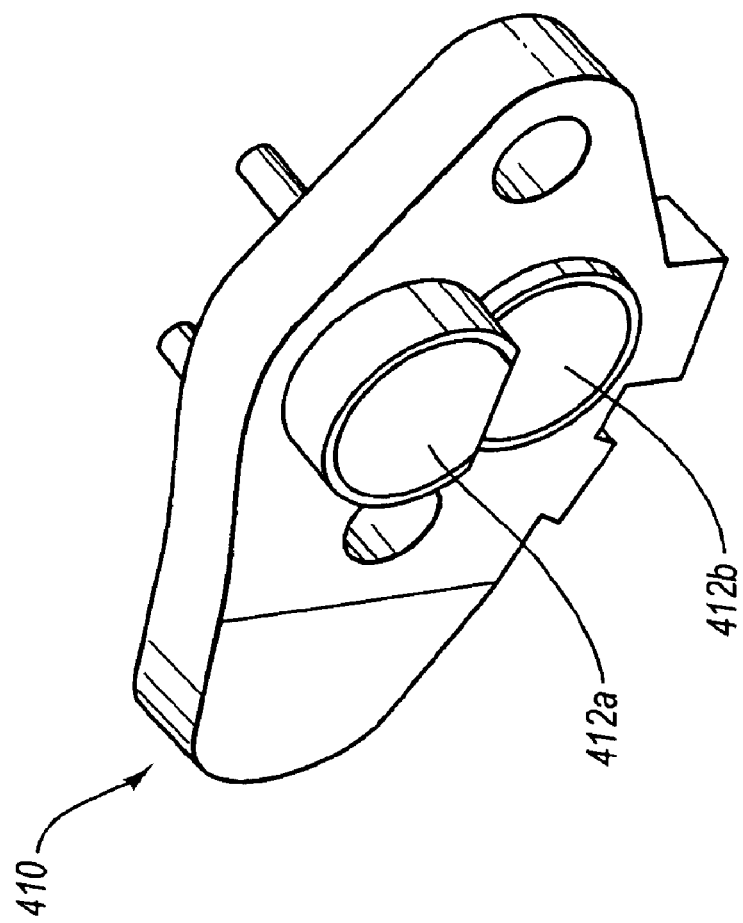

FIG. 4 is a perspective view of an embodiment of a lens piece 410. For reference purposes, a horizontal direction 444 and a vertical direction 446 are provided. The lenses 412 are positioned at different locations within the lens piece 410. More specifically, the first lens 412*a* is located in front of the second lens 412b in the horizontal direction 444. When the lens piece 410 is placed inside the reader 102, the distance between the first lens 412a and the first region 116a of the image sensor 114 is greater than the distance between the second lens 412b and the second region 116b of the image sensor 114. Consequently, the first optical image 118a formed on the first region 116a of the image sensor 114 has a higher resolution and a smaller field of view than the second optical image 118b formed on the second region 116b of the image sensor 114.

Figure 5:
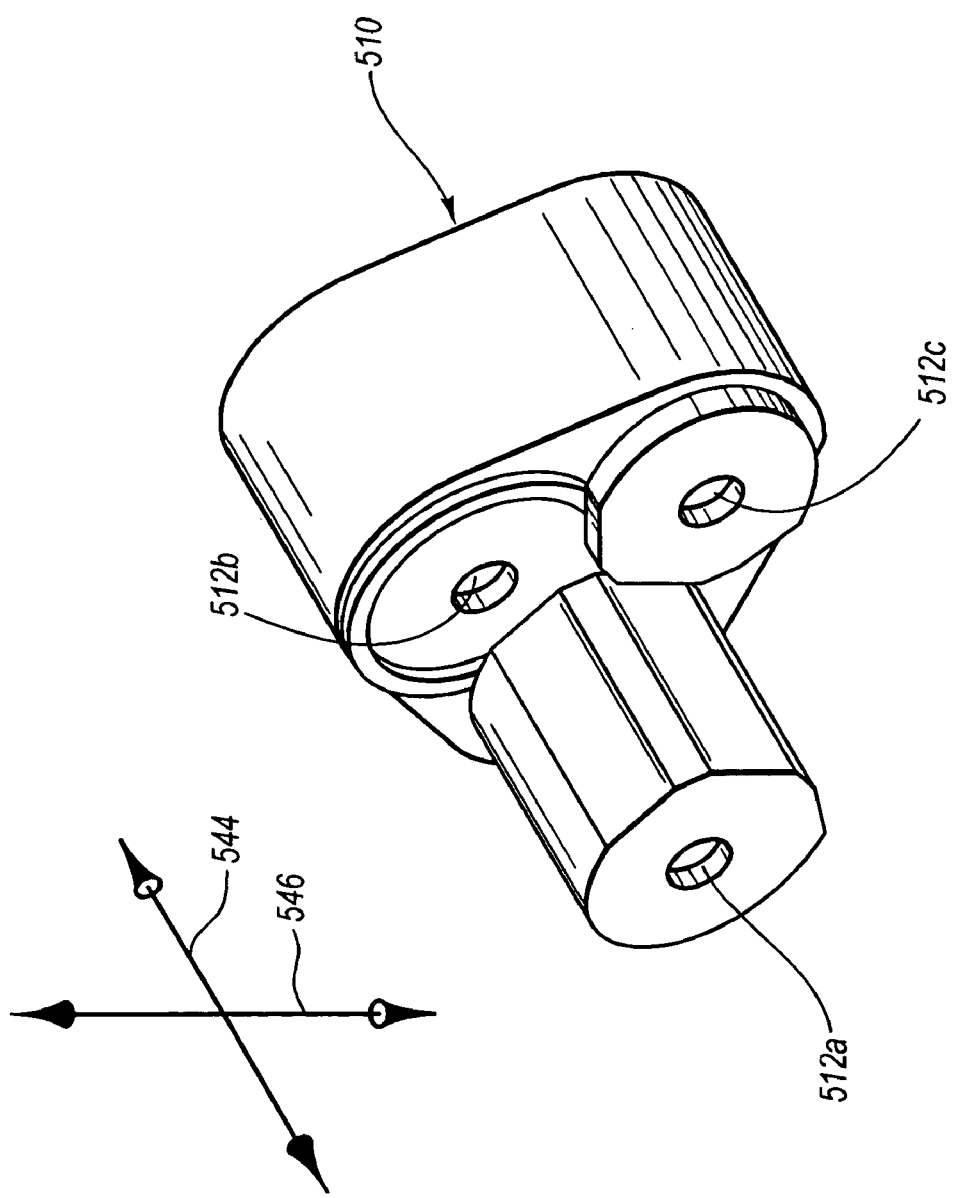
FIG. 5 is a perspective view of another embodiment of a lens piece.

FIG. 5 is a perspective view of another embodiment of a lens piece 510. As before, a horizontal direction 544 and a vertical direction 546 are provided. In the embodiment shown in FIG. 5, a third lens 512c is provided in addition to the first lens 512a and the second lens 512b. The illustrated lens piece 510 is configured for use with an image sensor that has been partitioned into three regions (not shown), a first region corresponding to the first lens 512a, a second region corresponding to the second lens 512b, and a third region corresponding to the third lens 512c.

The third lens 512c is located between the first lens 512a and the second lens 512b in the horizontal direction 544. When the lens piece 510 is placed inside the reader, the distance between the first lens 512a and the first region of the image sensor is greater than the distance between the third lens 512c and the third region of the image sensor. Consequently, the optical image that the first lens 512a forms on a first region of the image sensor has a higher resolution and a smaller field of view than the optical image that the third lens 512c forms on a third region of the image sensor.

Conversely, when the lens piece 510 is placed inside the reader, the distance between the third lens 512c and the third region of the image sensor is greater than the distance between the second lens 512b and the second region of the image sensor. Consequently, the optical image that the third lens 512c forms on the third region of the image sensor has a higher resolution and a smaller field of view than the optical image that the second lens 512b forms on the second region of the image sensor.

Figure 6:
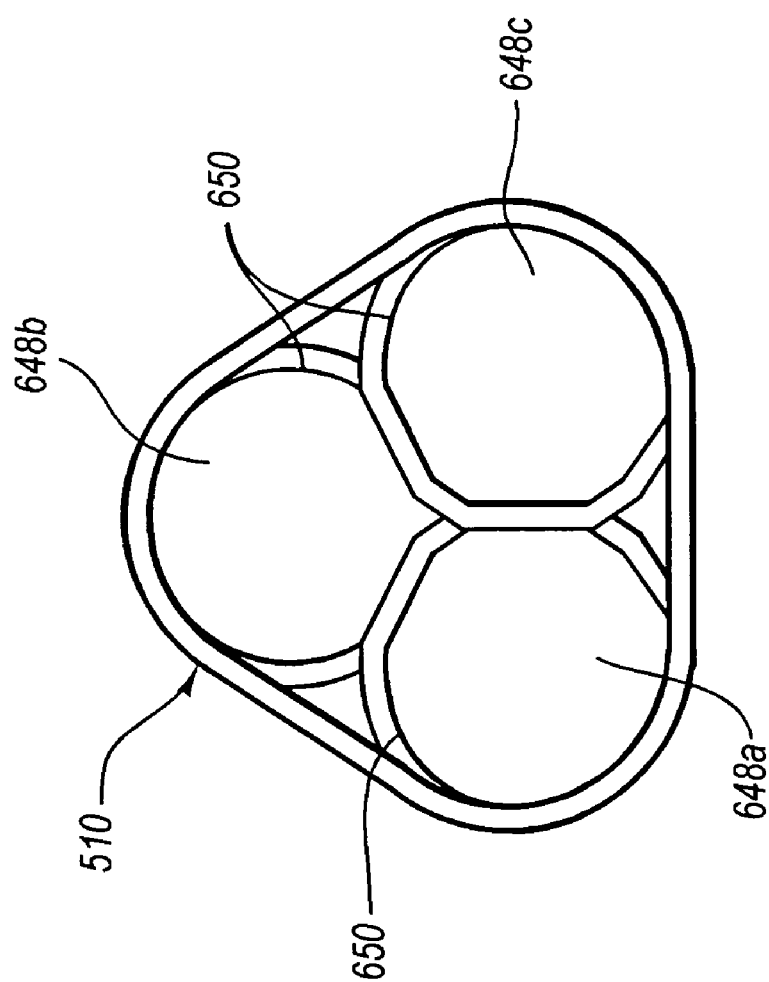
FIG. 6 is a cross-sectional view of the lens piece of FIG. 5.

FIG. 6 is a cross-sectional view of the lens piece 510 of FIG. 5. The lens piece 510 includes a first optical path 648a between the first lens 512a and the first region of the image sensor, a second optical path 648b between the second lens 512b and the second region of the image sensor, and a third optical path 648c between the third lens 512c and the third region of the image sensor. One or more baffles 650 surround each optical path 648. The baffles 650 prevent light in one optical path 648 from spilling over into another optical path 648.

Figure 7:
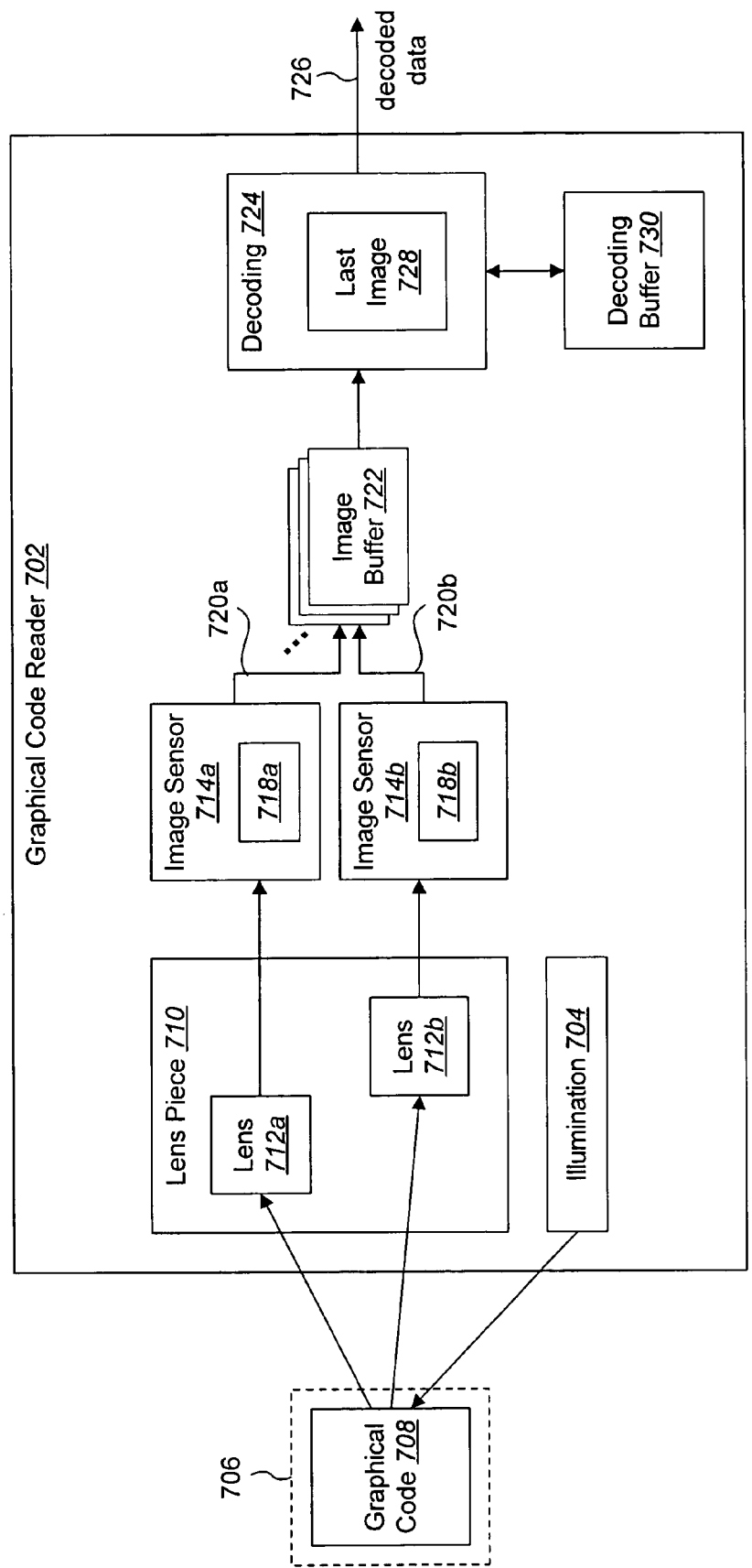
FIG. 7 is a block diagram illustrating functional components in another embodiment of a graphical code reader.

FIG. 7 is a block diagram illustrating functional components in another embodiment of a graphical code reader 702. The illustrated functional components may be implemented using any suitable combination of hardware, software, and/or firmware. In some embodiments, multiple functional components may be implemented by the same physical component.

The graphical code reader 702 shown in FIG. 7 is similar to the graphical code reader 102 shown in FIG. 1, except for the following. In the embodiment shown in FIG. 7, the graphical code reader 702 includes a plurality of image sensors 714, one image sensor 714 for each lens 712 in the lens piece 710. The illustrated embodiment includes two image sensors 714, a first image sensor 714a and a second image sensor 714b. Of course, in alternative embodiments, the graphical code reader 702 may include more than two image sensors 714.

Within the lens piece 710, the lenses 712 are positioned so that they focus light onto different image sensors 714. The first lens 712a is positioned so that it focuses light onto the first image sensor 714a, thereby forming a first optical image 718a on the first image sensor 714a. The second lens 712b is positioned so that it focuses light onto the second image sensor 714b, thereby forming a second optical image 718b on the second image sensor 714b.

The lenses 712 are located at different distances from their corresponding image sensors 714. In the illustrated embodiment, the distance between the first lens 712a and the first image sensor 714a is greater than the distance between the second lens 712b and the second image sensor 714b. This means that the first optical image 718a on the first image sensor 714a possesses a higher resolution than the second optical image 718b on the second image sensor 714b. Conversely, the first optical image 718a on the first image sensor 714a has a smaller field of view than the second optical image 718b on the second image sensor 714b.

A set of digital images 720 is obtained from the image sensors 714 in the reader 702. In the illustrated embodiment, the set of digital images 720 includes a first digital image 720a and a second digital image 720b. The first digital image 720a is obtained from the first image sensor 714a and is a digital representation of the first optical image 718a formed on the first image sensor 714a. The second digital image 720b is obtained from the second image sensor 714b and is a digital representation of the second optical image 718b formed on the second image sensor 714b. In typical embodiments, all of the digital images 720 within a particular set are obtained at substantially the same time. For example, in the illustrated embodiment, the first digital image 720a is obtained from the first image sensor 714a at substantially the same time as the second digital image 720b is obtained from the second image sensor 714b.

As in the embodiment described previously, the graphical code reader 702 also includes a decoding component 724. The decoding component 724 retrieves digital images 720 from the image buffers 722 and processes them in an attempt to decode them. In the illustrated embodiment, a digital image 720 is decoded when a certain number of graphical code symbols have been identified within the digital image 720. The specific number of graphical code symbols depends on the type of graphical code 708 that is being read. When a digital image 720 has been successfully decoded, the decoding component 724 outputs the decoded data 726.

As before, the decoding component 724 processes one digital image 720 at a time. Once the decoding component 724 decodes a digital image 720, it typically does not process any other digital images 720 within the same set (i.e., that were captured at substantially the same time). For example, in the illustrated embodiment, suppose that the decoding component 724 begins processing a set of digital images 720 by processing the first digital image 720a. If the decoding component 724 decodes the first digital image 720a, the decoding component 724 typically does not process the second digital image 720b.

The decoding component 724 keeps track of which image sensor 714 yielded the last successfully decoded image 728. When the decoding component 724 begins processing a new set of digital images 720, it starts processing the digital image 720 that corresponds to the last successfully decoded image 728 (i.e., the digital image 720 that comes from the same image sensor 714 as the last successfully decoded image 728). For example, in the illustrated embodiment, suppose that the decoding component 724 decodes a graphical code 708 in the second digital image 720b. When the decoding component 724 starts processing the next set of digital images 720, it would begin by processing the second digital image 720*b*.

Figure 8:
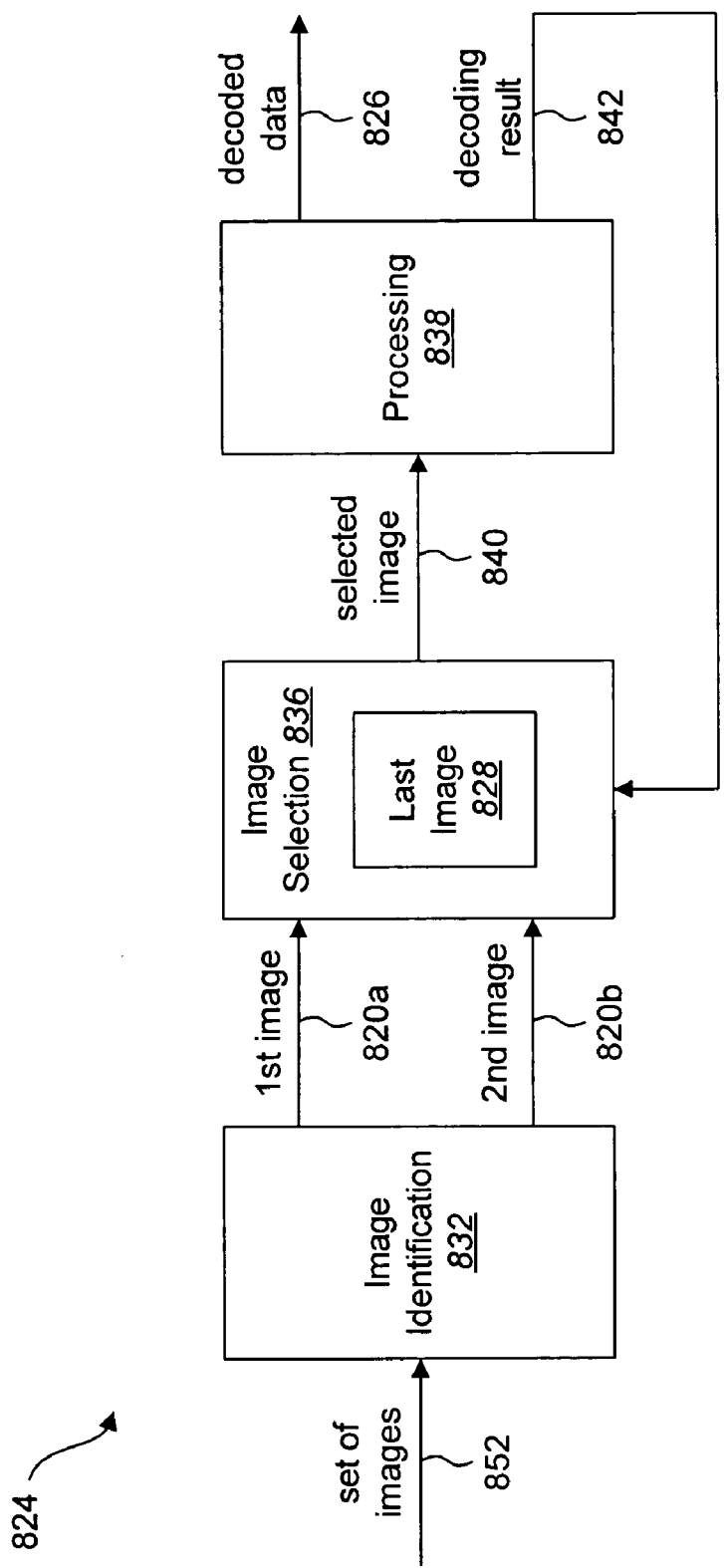
FIG. 8 is a functional block diagram illustrating the components in an embodiment of a decoding component.

FIG. 8 is a functional block diagram illustrating the components in an embodiment of a decoding component 824. The illustrated functional components may be implemented using any suitable combination of hardware, software, and/or firmware. In some embodiments, multiple functional components may be implemented by the same physical component.

The decoding component 824 includes an image identification component 832. The image identification component 832 receives a set 852 of digital images 820 as input and identifies the different digital images 820 within the set 852. Where the graphical code reader 702 includes N image sensors 714, the image identification component 832 typically identifies N digital images 820 in a set 852. The different digital images 820 correspond to the different image sensors 714 in the graphical code reader 702. In other words, the first digital image 720*a* is a digital representation of the first optical image 718*a* formed on the first image sensor 714*a*, the second digital image 720*a* is a digital representation of the second optical image 718*b* formed on the second image sensor 714*b*, and so on. In the illustrated embodiment, the image identification component 832 identifies two digital images 820 within the set 852, a first digital image 820*a* and a second digital image 820*b*.

The decoding component 824 also includes an image selection component 836 and a processing component 838. The image selection component 836 receives the different images 820 within the set 852 as input and selects one of the images 820 for processing. This selected image 840 is provided to the processing component 838 for processing.

After the selected image 840 is processed, the processing component 838 provides decoding result information 842 to the image selection component 836. The decoding result information 842 indicates whether the selected image 840 was successfully decoded. If the selected image 840 was successfully decoded, the processing component 838 also outputs the decoded data 826.

An example of how the image selection component 836 selects an image 820 for processing will now be described. As shown, the image selection component 836 keeps track of which image sensor 714 yielded the last successfully decoded image 828. If no images 820 within a set 852 have previously been processed, the image selection component 836 selects the image 820 corresponding to the last successfully decoded image 828, i.e., the digital image 820 within the current set 852 that was obtained from the same image sensor 714 as the last successfully decoded image 828. If the processing component 838 does not successfully decode this image 820, the image selection component 836 then selects one of the remaining images 820 within the set 852 for processing. If one of the remaining images 820 is successfully decoded, this image 820 then becomes the last successfully decoded image 828. If all of the images 820 within a set 852 have been processed and none of them have been successfully decoded, a new set 852 of digital images 820 is retrieved from the image buffers 722 for processing.

Figure 9:
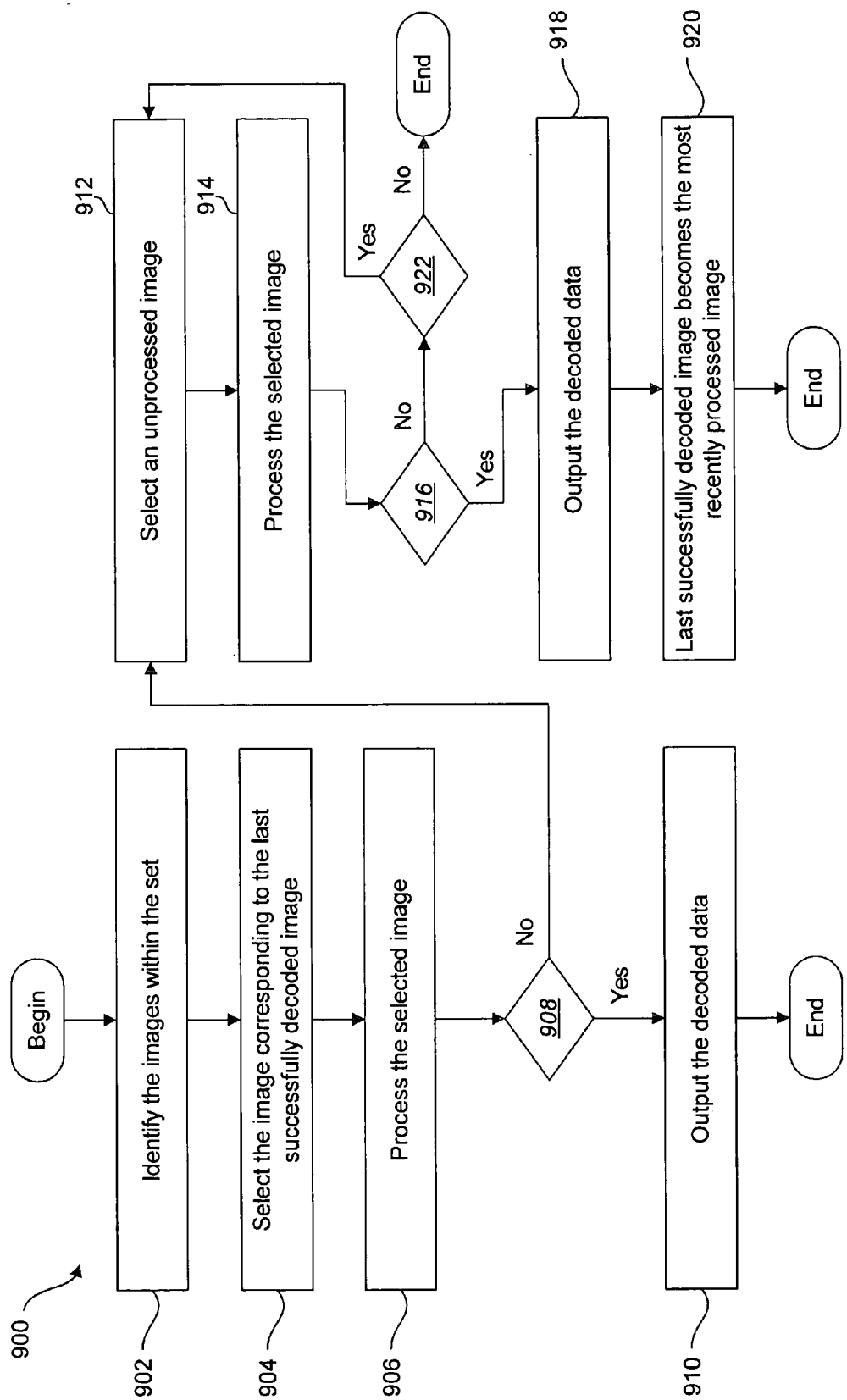
FIG. 9 is a flow diagram illustrating an exemplary method for processing a set of digital images.

FIG. 9 is a flow diagram illustrating an exemplary method 900 for processing a set 852 of digital images 820. The method 900 may be performed by the embodiment of the decoding component 824 shown in FIG. 8. The order of the steps of the method 900 is for illustrative purposes only and is not meant to imply a required order.

After a set 852 of digital images 820 is obtained from the image sensors 714 in the graphical code reader 702, the image identification component 832 identifies 902 the different images 820 within the set 852. The image selection component 836 selects 904 the image 820 that corresponds to the last successfully decoded image 828 and provides this selected image 840 to the processing component 838. The processing component 838 processes 906 the selected image 840.

The processing component 838 determines 908 whether the selected image 840 is successfully decoded. If so, the processing component 838 outputs 910 the decoded data 826 and the method 900 ends. If not, the processing component 838 informs the image selection component 836, via the decoding result information 842, that decoding was not successful. The image selection component 836 then selects 912 an unprocessed image 820 within the set 852, and provides this selected image 840 to the processing component 838. The processing component 838 processes 914 the selected image 840.

The processing component 838 determines 916 whether the selected image 840 is successfully decoded. If so, the processing component 838 outputs the decoded data 826, and the last successfully decoded image 828 becomes 920 the most recently processed image 820 (i.e., the selected image 840). The method 900 then ends.

If in step 916 the processing component 838 determines that the selected image 840 was not successfully decoded, the processing component 838 informs the image selection component 836, via the decoding result information 842, that decoding was not successful. The image selection component 836 then determines whether there are any additional images 820 within the set 852 that have not been processed. If not, the method 900 ends. If so, the method 900 returns to step 912 and proceeds as described above.

Figure 10:
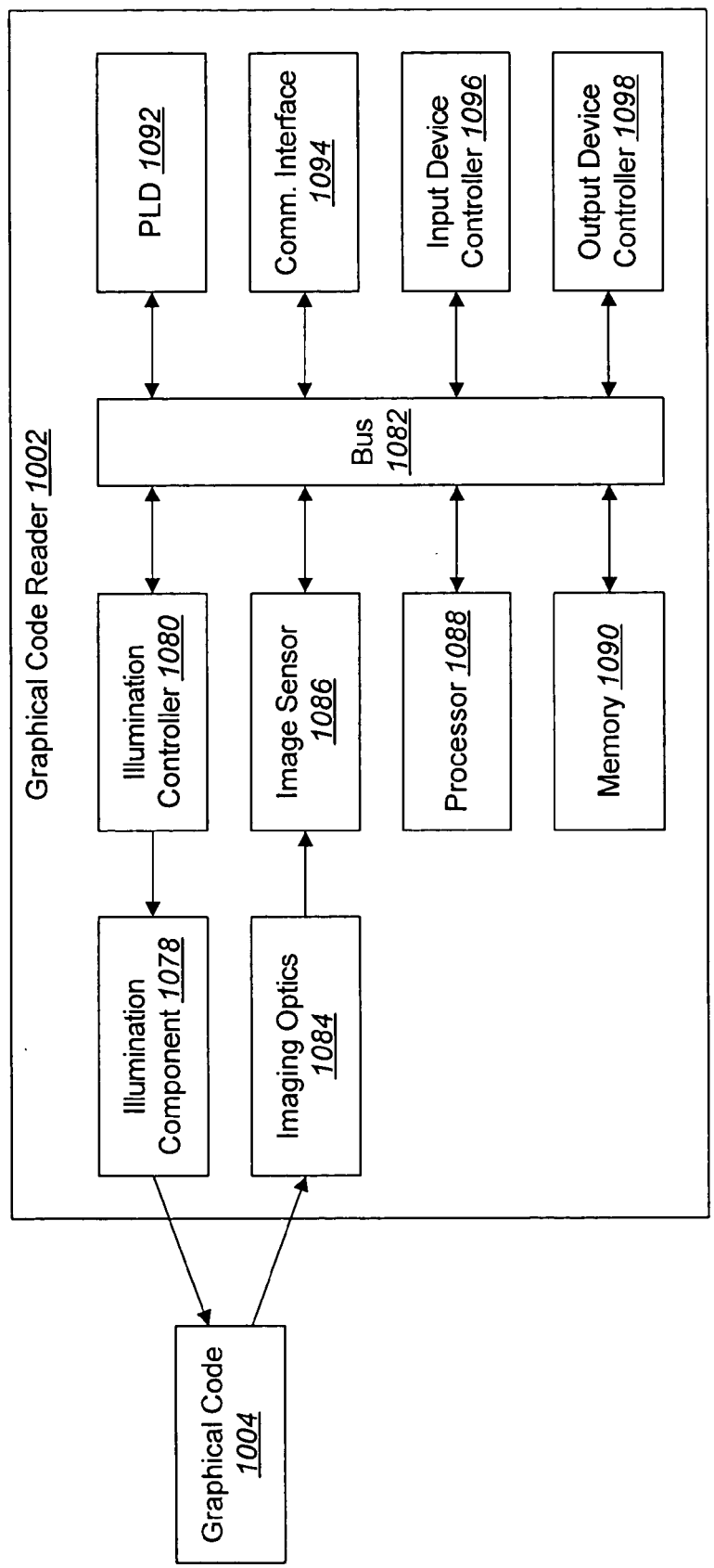
FIG. 10 is a block diagram illustrating physical components in an embodiment of a graphical code reader.

FIG. 10 is a block diagram illustrating physical components in an embodiment of a graphical code reader 1002. The physical components shown in FIG. 10 may be used to implement the functional components described previously. The different components may be located within the same physical structure or in separate physical structures.

The graphical code reader 1002 includes an illumination component 1078. The illumination component 1078 typically includes a plurality of illumination elements that may be activated to illuminate a graphical code 1004. The illumination component 1078 is controlled by an illumination controller 1080, which is in electronic communication with other components in the graphical code reader 1002 via a system bus 1082.

The graphical code reader 1002 also includes imaging optics 1084 and an image sensor 1086. The image sensor 1086 includes a plurality of light-sensitive elements. The imaging optics 1084 focus light reflected from the area illuminated by the illumination component 1078 onto the image sensor 1086. Examples of image sensors 1086 include charge coupled devices (CCDs) and complementary metal-oxide semiconductor (CMOS) sensors. A housing (not shown) is typically also provided for shielding the light-sensitive elements in the image sensor 1086 from ambient light. The image sensor 1086 is in electronic communication with other components in the graphical code reader 1002 via the system bus 1082.

The graphical code reader 1002 also includes a processor 1088 and memory 1090. The processor 1088 controls the operation of the graphical code reader 1002 and may be embodied as a microprocessor, a microcontroller, a digital signal processor (DSP) or other device known in the art. The processor 1088 typically performs logical and arithmetic operations based on program instructions stored within the memory 1090.

As used herein, the term "memory" 1090 is broadly defined as any electronic component capable of storing electronic information, and may be embodied as read only memory (ROM), random access memory (RAM), magnetic disk storage media, optical storage media, flash memory devices in RAM, on-board memory included with the processor 1088, EPROM memory, EEPROM memory, registers, etc. The memory 1090 typically stores program instructions and other types of data. The program instructions may be executed by the processor 1088 to implement some or all of the methods disclosed herein. The processor 1088 and memory 1090 are in electronic communication with other components in the graphical code reader 1002 via the system bus 1082.

The graphical code reader 1002 typically also includes one or more programmable logic devices (PLDs) 1092. The PLDs 1092 may be programmed to carry out logic functions that implement, either partially or completely, some or all of the methods disclosed herein. Examples of different types of PLDs 1092 that may be used include field-programmable gate arrays (FPGAs), logic-cell arrays (LCAs), programmed arrays of logic (PALs), complex programmable-logic devices (CPLDs), and so forth. The PLDs 1092 are in electronic communication with other components in the graphical code reader 1002 via the system bus 1082. Those skilled in the art will recognize that one or more application-specific integrated circuits (ASICs) may be used in place of or in addition to the PLDs 1092.

The graphical code reader 1002 typically also includes one or more communication interfaces 1094 for communicating with other electronic devices. The communication interfaces 1094 may be based on wired communication technology, wireless communication technology, or both. Examples of different types of communication interfaces 1094 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth. The communication interfaces 1094 are in electronic communication with other components in the graphical code reader 1002 via the system bus 1082.

The graphical code reader 1002 typically also includes one or more input device controllers 1096 for controlling input devices, such as keys, buttons, etc. The graphical code reader 1002 typically also includes one or more output device controllers 1098 for controlling output devices, such as a display screen. The input device controllers 1096 and output device controllers 1098 are in electronic communication with other components in the graphical code reader 1002 via the system bus 1082.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In a graphical code reader, a method comprising:
   forming a first optical image on a first region of an image sensor;
   forming a second optical image on a second region of the image sensor, wherein the first optical image has a higher resolution and a smaller field of view than the second optical image;
   obtaining a digital image from the image sensor, wherein a first region of the digital image corresponds to the first optical image on the first region of the image sensor, and wherein a second region of the digital image corresponds to the second optical image on the second region of the image sensor;
   selecting one of the first region of the digital image and the second region of the digital image to obtain a selected region, wherein the selected region corresponds to a same region of the image sensor as a decoded region in a most recently decoded digital image; and
   processing the selected region of the digital image before processing any other region of the digital image.

2. In a graphical code reader, a method comprising:
   forming a first optical image on a first image sensor;
   forming a second optical image on a second image sensor, wherein the first optical image has a higher resolution and a smaller field of view than the second optical image;
   obtaining a set of digital images, wherein the set of digital images comprises a first digital image corresponding to the first optical image on the first image sensor and a second digital image corresponding to the second optical image on the second image sensor;
   selecting one of the first digital image and the second digital image to obtain a selected digital image, wherein the selected digital image corresponds to a same image sensor as a most recently decoded digital image; and
   processing the selected digital image before processing any other digital image of the set of digital images.

3. A graphical code reader, comprising:
   an image sensor;
   a first lens that forms a first optical image on a first region of the image sensor;
   a second lens that forms a second optical image on a second region of the image sensor;
   a region selection component that obtains a digital image from the image sensor and selects one of a first region of the digital image and a second region of the digital image to obtain a selected region of the digital image, wherein the first region of the digital image corresponds to the first optical image on the first region of the image sensor, wherein the second region of the digital image corresponds to the second optical image on the second region of the image sensor, and wherein the selected region of the digital image corresponds to a same region of the image sensor as a decoded region in a most recently decoded digital image; and
   a processing component that processes the selected region of the digital image before processing any other region of the digital image.

4. The graphical code reader of claim 3, wherein a first distance between the first lens and the first region of the image sensor is greater than a second distance between the second lens and the second region of the image sensor.

5. The graphical code reader of claim 3, wherein the first lens is substantially identical to the second lens.

6. The graphical code reader of claim 3, wherein the first lens and the second lens are fixed in position.

7. A graphical code reader comprising:
a first image sensor;
a first lens that forms a first optical image on the first image sensor;
a second image sensor;
a second lens that forms a second optical image on the second image sensor, wherein a first distance between the first lens and the first image sensor is greater than a second distance between the second lens and the second image sensor;
an image selection component that obtains a set of digital images comprising a first digital image corresponding to the first optical image on the first image sensor and a second digital image corresponding to the second optical image on the second image sensor and that selects one of the first digital image and the second digital image to obtain a selected digital image, wherein the selected digital image corresponds to a same image sensor as a most recently decoded digital image; and
a processing component that processes the selected digital image before processing any other digital image of the set of digital images.

8. The graphical code reader of claim 7, wherein the first lens is substantially identical to the second lens.

9. The graphical code reader of claim 7, wherein the first lens and the second lens are fixed in position.

* * * * *

UNITED STATES PATENT AND TRADEMARK OFFICE
CERTIFICATE OF CORRECTION

PATENT NO. : 6,942,152 B1
DATED : September 13, 2005
INVENTOR(S) : Paul J. Hepworth It is certified that error appears in the above-identified patent and that said Letters Patent is hereby corrected as shown below:

Column 15,
Line 1, replace "reader comprising" with -- reader, comprising --.

Signed and Sealed this

Twentieth Day of December, 2005

JON W. DUDAS
*Director of the United States Patent and Trademark Office*